(No Model.)
S. H. ROUART.
Preparations Melting under 32 Fahrenheit, Apparatus therefor and their Application.
No. 234,494. Patented Nov. 16, 1880.
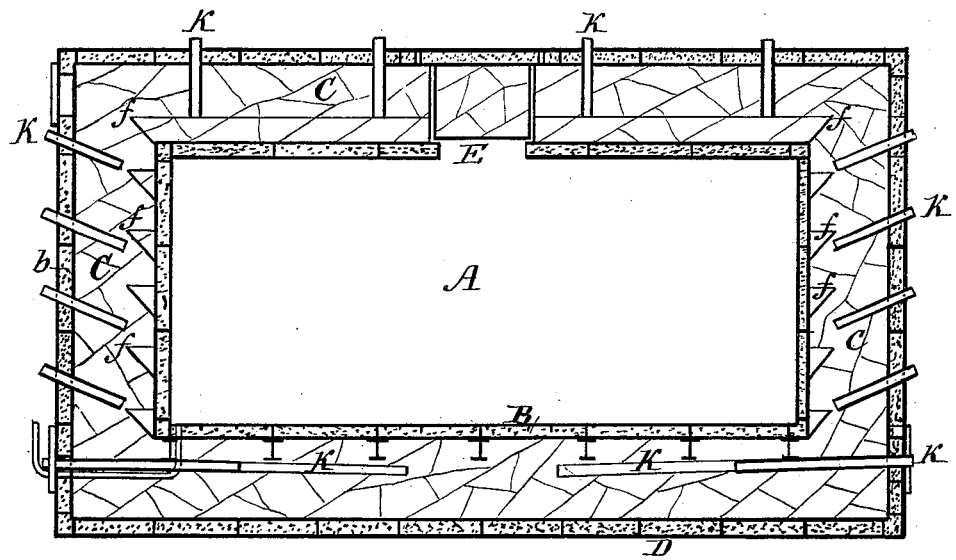
Witnesses:
E. E. Masson.
Bartram Zevely
Inventor:
Stanislas Henri Rouart.
by A. Pollok,
his Attorney.

UNITED STATES PATENT OFFICE.

STANISLAS H. ROUART, OF PARIS, FRANCE.

PREPARATIONS MELTING UNDER 32° FAHRENHEIT, APPARATUS THEREFOR, AND THEIR APPLICATION.

SPECIFICATION forming part of Letters Patent No. 234,494, dated November 16, 1880.

Application filed September 21, 1880. (No model.) Patented in France June 4, 1880.

*To all whom it may concern:*

Be it known that I, STANISLAS HENRI ROUART, engineer, (of the firm of Dignon & Rouart,) a citizen of the Republic of France, and residing in Paris, France, have invented Preparations Melting Under 32° Fahrenheit, Apparatus Employed Therefor, and their Application, (for which I have obtained a French patent, June 4, 1880,) of which the following is a specification.

This invention has for its general object to enable a temperature below the freezing-point of water, or zero centigrade, for the preservation by cold of food and other substances, and for other purposes, to be obtained readily and economically, and in it the well-known action of ice and salt and similar mixtures in producing a low temperature is utilized.

Ordinary pure water can be readily frozen, and when the frozen mass is allowed to melt by itself a temperature of zero, being one of the starting-points on the centigrade and other thermometric scales, is obtained in the partly-fluid mass resulting from the melting.

If attempt is made to freeze a saline solution a separation of the materials takes place, a part of the water freezes, and the salt remains dissolved in the remainder, the solution becoming more and more concentrated until it becomes uncongealable at the temperature employed. It is a phenomenon analogous to that which takes place in evaporating a similar liquid; but as with evaporation, so in the case of freezing, there are all sorts of modifying circumstances, and the phenomenon does not take place with the simplicity which from theory would be expected.

By means of refrigerating apparatus or ice-machines producing very low temperatures a sudden congelation or freezing, having analogy to tumultuous evaporation, can be produced. If, therefore, water containing a certain proportion of common salt—sea-water, for example—is frozen in an apparatus in which a temperature of 20° below zero, centigrade, (20°—c.,) is maintained, the separation of the salt and ice from each other is very incomplete, and the salt is in great part imprisoned in the ice. The ice, when broken and left to itself, produces a temperature below zero. The temperature produced can be made lower by increasing the proportion of salt contained in the ice.

A solution of salt and water is selected as an example merely. The nature and quantity of the substance dissolved in the water can be varied at will, according to the special object in view. A salt, an acid, alcohol, or other suitable soluble material can be used.

From the nature of the liquid it follows that particles from the salt in the solution remain, so to say, imprisoned in the frozen water, and act also, as in freezing-mixtures, to give a temperature lower than that which would result simply from the melting of the mixture. Thus a solution which in freezing remains at 2° or 3° below zero, centigrade, would in melting give a temperature practically constant and several degrees lower.

Ice, which melts below zero, and which consequently can maintain objects surrounded by or placed in juxtaposition with it at a similar low degree, can be obtained as described practically and without considerable expense. For example, in the preservation of food, and particularly of meat and fish, in land-vehicles or in ships, it will be enough to replace the ordinary ice with this colder ice to materially improve the preservation. In this way the advantages of refrigerating apparatus or ice-machines on railway-cars or on ships can be obtained with the simple appliances used with common ice.

An analogous effect to that before indicated can be obtained with ordinary ice by mixing it with a substance such as common salt, which produces a freezing or refrigerating mixture. The difficulty, however, is to obtain a practically constant low temperature with the use of a relatively small proportion of salt. If the materials are all mixed together at once, there is a sudden fall of temperature, but it does not last. It is necessary, then, to mix little by little the quantity of salt required to accomplish the effect described.

An apparatus by which this result can be effected will now be described in connection with the accompanying drawing, forming a part of this specification, and representing a vertical section of said apparatus. Certain precautions which it is well to take in the disposition of the preserving apparatus or refrigerator will be indicated.

The substances to be preserved are to be placed in the chamber A. They should previously be cooled to the lowest temperature that can practically be obtained—about 20° below zero. The chamber A is inclosed by a very thin layer, B, of isolating material, which separates it from the reservoir or ice-receptacle C. This reservoir or receptacle is itself inclosed by a non-conducting covering, D, and in it the preparation melting below zero is placed. The introduction of the materials to be preserved is made through the opening E, which should be closed by a door rendered non-conducting by suitable material. Pieces $f$ are placed lengthwise on the inner wall of reservoir C, so as to keep the ice or freezing-mixture as much as possible in contact with said wall.

In case it is desired to draw off the liquid resulting from melting, ordinary means can be provided for the purpose.

In case it is desired to use simply a freezing-mixture, or to use additional salt with ice having salt-particles imprisoned, a number of tubes, $k$, are suitably arranged, so that salt may be introduced through the reservoir C at suitable intervals. These tubes should be numerous enough to allow the salt to be introduced sometimes by one, sometimes by another, so as to distribute as much as possible the saline material. This distribution could be made mechanically, if desirable or necessary.

It will be understood that the details of construction can be varied at will according to the particular purpose in view.

It is obvious that the apparatus described can be embodied in especially-built cars, wagons, or boats, or in movable cases of suitable dimensions to be carried on ordinary boats or vehicles.

The cases, when landed, will serve as refrigerators or pressing-boxes, and need not be opened until it is necessary to remove their contents. They can of course be covered with suitable material.

Having thus fully explained the said invention, what I claim is—

1. The method of making a solid preparation melting below the freezing-point of water by subjecting a saline or equivalent solution, in regulated quantities, to a very low temperature, substantially as described.

2. As a new product or manufacture, solid ice inclosing particles of salt or other material producing a low temperature with ice, in proportion sufficient to materially lower the melting-point of the mixture, substantially as described.

3. An apparatus comprising an inner chamber, an outer reservoir or ice-receptacle, non-conducting walls, and gutter-shaped attachments on the inner wall of said reservoir, extending lengthwise thereof.

4. The combination, with the reservoir or ice-receptacle of a refrigerator or ice-box, of a series of tubes for the introduction of salt or similar substance, forming with the ice in said reservoir a freezing-mixture, substantially as described.

5. The combination of the provision-chamber, ice receptacle or reservoir, gutter-shaped attachments on the inner wall of said reservoir, and the tubes for introducing salt or similar material, substantially as described.

In testimony whereof I have signed my name to this specification in the presence of two subscribing witnesses.

STANISLAS HENRI ROUART.

Witnesses:
ALFRED COINY,
ROBT. M. HOOPER.